United States Patent Office 3,848,057
Patented Nov. 12, 1974

3,848,057
METHOD AND COMPOSITION FOR REMOVING ACIDIC CONTAMINANTS FROM GASES
Frederic Leder, Elizabeth, David W. Savage, Summit, and Adam L. Shrier, Montclair, N.J., assignors to Exxon Research and Engineering Company
No Drawing. Filed Oct. 1, 1971, Ser. No. 185,898
Int. Cl. B01d 53/16, 53/34
U.S. Cl. 423—223                                11 Claims

ABSTRACT OF THE DISCLOSURE

When using solutions of potash or other alkali metal salts such as carbonates, hydroxides, borates, phosphates or bicarbonates to absorb acid gases such as $H_2S$ and $CO_2$ from gaseous mixtures, it has unexpectedly been discovered that the absorption capability and particularly the subsequent desorption of the solution may be significantly enhanced by adding to the solution a synergistic promoter system comprising piperidine or derivatives thereof and/or 1,6-hexanediamine or derivatives thereof plus weakly acidic $CO_2$ hydration catalysts such as boric acid, sulfurous acid or formaldehyde.

PRIOR ART

The use of potash or other alkali metal salt solutions to absorb acid gases such as $CO_2$, $H_2S$, $SO_2$ and COS from gas mixtures is well known. In U.S. Pat. 2,718,454 the patentee makes use of potash and similar alkali metal salts in conjunction with amines such as monoethanolamine, diethanolamine and triethanolamine to remove acid gases from the solution. The combination of the alkali metal compounds in conjunction with the designated amine yield higher capacity for acid gases than in systems with the amine alone.

In British Patent 1,063,517 to Allen G. Eickmeyer, the problem was again the removal of acid bodies such as $CO_2$ and $H_2S$ from a gaseous mixture. Patentee, in the British reference, teaches the use of potassium carbonate and potassium borate in conjunction with particular amines, which will avoid corrosion problems, and at the same time accelerate the absorption and subsequent desorption of the $CO_2$ and $H_2S$. Specifically, patentee makes use of ethylene polyamine, alkanolamines or alkanolamine borates as well as mixtures thereof. Examples of such amines are ethylenediamine, diethyltriamine, diethanolamine, etc.

In U.S. Pat. 3,144,301 there is disclosed the use of potassium carbonate in conjunction with diethanolamine and monoethanolamine to remove $CO_2$ from gas mixtures.

All of these techniques represent methods by means of which acid gas may be successfully removed; they have, however, shown a limited rate and capacity for acid gas removal, and more important they have shown limited rate for desorption. With desorption rate limitations costs are high owing to the large contacting area needed in the desorber (stripper) and the high stripping steam requirement. Scrubbing costs could be reduced significantly by lowering the stripping steam requirement. Consequently, a method is needed which will provide substantial rates and capacity for acid gas removal and simultaneously provide for rapid desorption of the substantially saturated absorbing solution, with lower steam requirement.

SUMMARY OF THE INVENTION

According to this invention, it has unexpectedly been discovered that when a synergistic promoter system comprising a mixture of weakly acidic $CO_2$ hydration catalysts such as boric acid, sulfurous acid or formaldehyde in conjunction with certain amines including piperidine and its derivatives and/or 1,6-hexanediamine and its derivatives is added to aqueous alkali metal salt solutions, the resulting solution has a high capacity for the removal of acid gases, and when the solution is substantially saturated with acid gases it has further been unexpectedly discovered that the solution may be desorbed or reactivated rapidly by conventional means, with less stripping gas than is required with presently known solutions.

The synergistic promoter system of the instant invention is added in the form of a mixture of weakly acidic $CO_2$ hydration catalysts and an amine selected from the groups specified below. The amine to be utilized may be selected from one of several groups including those that are capable of forming regions of liquid-liquid immiscibility at low $CO_2$ loadings when mixed in an alkali metal salt solution, such as potash. Such amines include piperidine and its derivatives, and 1,6-hexanediamine and its derivatives. Other suitable amines are those which exhibit relatively high reactivity towards $CO_2$ and exist largely in the free amine form in potash solutions (as opposed to carbamate, etc.). These include ethylamino-ethanol, methylamino-ethanol, pyrrolidine, morpholine, toluene diamine, diamino-benzene and xylylene diamine. The amine concentration will vary between about 2 and 20 wt. percent in a solution where alkali salt content should vary between 5 and 40 wt. percent. The promoter system is utilized at temperatures of about 25–200° C. and pressures of from about 5 to 2,000 p.s.i.g. during absorption. Desorption takes place at about 0–100 p.s.i.g. and about 100–200° C.

The hydration catalyst component of the promoter system is added in an amount which would represent about 0.5 to 5 moles of hydration catalyst per mole of amine. Preferred hydration catalysts include boric acid, sulfurous acid and formaldehyde. These ionize to a significant extent in alkaline media to form anions in solution such as $B(OH)_2O^-$ or $B(OH)_4^-$. In a solution of appropiate pH, usually 8.5–10, these anions, catalyze the decomposition of bicarbonate to water and $CO_2$.

Furthermore, being weakly acidic, these substances tend to produce solutions of lower pH, thus further facilitating desorption. Other hydration catalysts that may be used include hypobromous, hypochlorous, arsenious, germanic and telluric acids, hydrocyanic, silicic, selenious acids, protides and amino acids, glycine, phenols, e.g., o-cresol, chlorophenol, resorcinol, d-alanine, histidine, hydroxybenzoic acid, lysine, tryptophan, xanthine. The choice in practice is made on the basis of catalytic power, solubility, ionization constant, stability, corrosiveness, toxicity, availability and cost.

The presence of the hydration catalyst guarantees that the liquid will be in one phase throughout the course of absorption and desorption since two phases cannot form when the hydration catalyst is present in the amounts indicated herein.

The contacting of the absorbent mixture and the acid gas may take place in any suitable contacting tower. The gas to be contacted and removed, which has been described as an acid gas, would include $SO_2$, $CO_2$, COS, $H_2S$, HCN, $CS_2$ and oxides and sulfur derivatives of $C_1$ through $C_4$ hydrocarbons. These acid gases may be present in trace amounts within a gaseous mixture or in major proportions.

The absorbing solution will comprise a major proportion of alkali metal compounds and a minor proportion of the promoter system.

A typical composition of the promoter system would be a 2–20 wt. percent of 1,6-hexanediamine and boric acid in amounts such that the ratio mols boric acid/mols 1,6-hexanediamine is 0.5 to 5. In general, the total amount of promoter system in the aqueous alkali metal salt solution will not exceed about 25 wt. percent. The upper limit to additive concentration is set to avoid crystallization from solution.

The absorbent solution, after a period of time becomes substantially saturated and must be then subjected to regeneration. Usually, the system is about 50 to 95% saturated preferably about 60–90% saturated (with respect to alkali metal salt charged) when it is regenerated. Regeneration takes place by traditional methods, such as steam stripping.

Upon entering the regeneration unit the solution is substantially saturated, as indicated above, and in one phase. Stripping of the acid gas may be accomplished conventionally by blowing with steam or inert gas according to techniques well known in the art. Stripping is facilitated, however, because of the presence of the synergistic promoter system, which is preferably boric acid and piperidine or 1,6-hexanediamine in the above-described ratios. The solution is stripped to where it is 10 to 40% saturated, preferably 15 to 35%.

The $CO_2$ hydration catalyst component, e.g., boric acid of the promoter system, accelerates $CO_2$ release by the reaction $$H_2CO_3 \rightarrow CO_2 + H_2O$$

during desorption (and the reverse reaction during absorption). This provides another reaction path for $CO_2$ transfer in the desorber in addition to the amine carrier mechanism resulting from the amine component, e.g., 1,6-hexanediamine of the promoter system $$(\text{carbamate})^- + H^+ \rightarrow CO_2 + \text{free amine}$$

as well as direct desorption of the bicarbonate.

Furthermore, the presence of the weakly acidic hydration catalyst, through its effect on solution pH, facilitates desorption by both mechanisms, thus introducing synergism.

Another advantage is that a properly formulated synergistic promoter system has the capability to reduce corrosion normally encountered in acid gas scrubbing operations with amine promoted potash solutions.

More specifically, the instant invention pertains to a method for removal of acid gases from gaseous mixtures in which they are carried. By acid gases it is meant $CO_2$, $H_2S$, HCN, $CS_2$, $SO_2$, COS and oxides and sulfur derivatives of methane, ethane, propane and butane. Such acid gases in the fluid or gaseous state are found in mixtures of natural gas, synthetic gas (mainly methane), hydrogen and hydrogen and nitrogen. The removal of these acid gases is essential since some of them are inherently corrosive and tend to precipitate during processing, others are pollutants or diluents and some are catalyst poisons. To remove these acid gases from the mixture, the mixture while in the fluid, preferably the gaseous state, must be brought into contact with a suitable liquid absorbent which will preferentially absorb the acid gases and at the same time substantially exclude other elements of the mixture. It has been known in the past to use alkali metal carbonates, bicarbonates and hydroxides for the absorption of the acid gases from a fluid or gaseous mixture. Alkali metal salts which may be utilized are alkali metal bicarbonates, carbonates, hydroxides, borates and phosphates. Typical compounds which have been utilized include sodium hydroxide, sodium hydrosulfide, sodium sulfide, sodium bicarbonate, sodium carbonate, lithium hydroxide, lithium bicarbonate, lithium carbonate, potassium hydroxide, potassium bicarbonate and potassium carbonate, cesium carbonate, bicarbonate and borates and phosphates of the above-mentioned metals.

The preferred alkali metal salts for use in the instant invention are potassium carbonate and sodium carbonate. The alkali metal salts, e.g., carbonates, may be present in an amount of about 5 to 40 wt. percent of the solution, the upper limit being determined by the concentration at which salt precipitation occurs under the conditions of operation. It is noted that the solution is preferably aqueous. A preferred amount of alkali metal salt would be from about 15 to 40 wt. percent and the most preferred amount would be from about 25 to 35 wt. percent.

The amines which are to be utilized in the instant invention are preferably piperidine and its derivatives and 1,6-hexanediamine and its derivatives. The derivatives of piperidine are as follows:

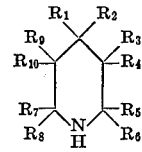

wherein $R_1$ to $R_{10}$ are selected from the group consisting of hydrogen, $C_1$ to $C_3$ alcohols, $C_1$ to $C_3$ alkyl groups, $C_2$ to $C_3$ alkenyl groups, amino groups, carboxyl groups, hydroxyl groups, sulfides, hydrosulfides, and phosphate groups. Also $R_1$ to $R_{10}$ may be $C_6$-$C_{12}$ aryl or substituted aryl groups, e.g., amino carboxyl, hydroxyl, provided the compounds remain at least partially miscible with the alkali metal salt solution. It is preferred that $C_1$ to $C_3$ alkyl, hydrogen or $C_2$ to $C_3$ alkenyl groups are utilized for the various R's. The most preferred compounds would utilize methane or hydrogen for the various R's; naturally, piperidine itself is a most preferred compound for the instant invention.

The other preferred amine is 1,6-hexanediamine and derivatives thereof. By derivatives of 1,6-hexanediamine it is meant the following:

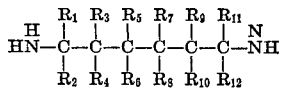

wherein $R_1$ to $R_{12}$ are selected from the group consisting of hydrogen, $C_1$ to $C_3$ alcohols, $C_1$ to $C_3$ alkyl groups, $C_2$ to $C_3$ alkenyl groups, amino groups, carboxyl groups, hydroxyl groups, sulfides, hydrosulfides and phosphate groups. $R_1$ to $R_{12}$ may also be $C_6$ to $C_{12}$ aryl or substituted aryl groups, e.g., amino, carboxyl, hydroxyl, provided the compounds remain at least partially miscible with the solution. It is preferred to select $R_1$ through $R_{12}$ from the groups consisting of hydrogen, $C_1$ to $C_3$ alcohols, $C_1$ to $C_3$ alkyl groups, and $C_2$ or $C_3$ alkenyl groups. The most preferred value for $R_1$ through $R_{12}$ is methane and hydrogen; needless to say, 1,6-hexanediamine is a most preferred compound for the instant invention.

The preferred catalyst element of the synergistic promoter system may be any of the following: boric acid, sulfurous acid, formaldehyde or any of the aforementioned or other hydration catalysts. The catalyst element of the synergistic promoter which is preferably boric acid is added in the following amount; 0.5–5.0 mols boric acid/mol amine, preferably 1.0 to 3.0 mols boric acid/mol amine.

The preferred ratio of catalyst/amine in the promoter system is dependant upon the application. In the design of new plants, the economic optimum which is determined from consideration of absorption rate, desorption rate, cyclic acid gas capacity and stripping steam requirement usually dictates catalyst/amine ratios of 0.5–2.0. For debottlenecking (increasing throughput) in existing plants which are usually desorber/steam limited, a higher catalyst/amine ratio of 1.0–4.0 would usually be preferred to take advantage of the relatively higher desorption rate and lower stripping steam requirement associated with this invention.

In addition, for corrosion inhibition with the preferred synergistic promoter system comprising boric acid and 1,6-hexamethylenediamine, the preferred ratio of boric acid to amine is greater than 1 mol boric acid/mol amine.

The contacting between the acid gas containing fluid mixture and the absorptive aqueous solution may be cocurrent or countercurrent; countercurrent is preferred. The contacting takes place in a single phase without regions of phase immiscibility. Temperature during the contacting may vary between 25 and 200° C., preferably 30 to 175° C., and most preferably 35 to 150° C. Pressures may vary widely, acceptable pressures are between 5 and 2,000 p.s.i.g., preferably 100 and 1,500 p.s.i.g., and most preferably 200 and 1,000 p.s.i.g. Generally, the countercurrent contacting to remove the acid gas will last for a period of from 0.1 to 60 minutes, preferably 1 to 5 minutes. Contacting may take place when the acid gas containing mixture is either in the liquid or gaseous state but the gaseous state is much preferred.

The contacting zone may be a packed tower, plate tower or any conventional gas scrubber. A standard stainless steel contacting tower is particularly effective. The tower may be equipped with bubble trays, perforated trays, Raschig rings or any other well known packing material to facilitate contacting. The gaseous mixture which is recovered with substantially all of the acidic gases removed may be used for many purposes such as ammonia synthesis, hydrotreating or liquefied natural gas or synthetic gas production. Absorbing solution, which is substantially saturated with acidic gases such as $CO_2$ and $H_2S$ must then be regenerated so that it may be used again.

The regeneration, which also takes place in a single liquid phase, is usually accomplished by flashing and passing steam through the liquid until the acid gases are stripped out. The absorbing solution after being cleansed of the acidic bodies, may be recycled back to the contacting tower. Makeup absorbent may be added as needed. Alternative methods for regenerating the contaminated absorbent include air or $N_2$ stripping.

Typically, in desorption, the acid gas, e.g., $CO_2$-rich solution from the high pressure absorber is sent first to a flash chamber where steam and some $CO_2$ are flashed from solution at low pressure. The amount of $CO_2$ flashed off will in general be about 35-40% of the net $CO_2$ recovered in the flash and stripper. This is increased somewhat, e.g., to 40-50%, with the high desorption rate promoter system owing to a closer approach to equilibrium in the flash. Solution from the flash drum is then steam stripped in a packed or plate tower, stripping steam being generated in the base of the stripper. Pressure in the flash drum and stripper is usually 1-100 p.s.i.g., preferably 2-10 p.s.i.g. as compared with 200-1,000 p.s.i.g. typically in the desorber. Temperature is between 100-175° C., preferably 110-160° C. Stripper and flash temperatures will, of course, depend on stripper pressure; thus at about 2-10 p.s.i.g. stripper pressures, the temperature will be about 110-160° C. during desorption.

With the synergistic promoter system stripping steam rates as low as 0.5 to 1.5 lbs. of steam per lb. of $CO_2$ may be used; however, stripping steam rates as high as about 0.5 to 5 lbs., or 0.5 to 3 lbs. may also be utilized.

In a preferred system of operation two towers, coupled together, are used. In the absorption tower, the gas mixture to be treated passes countercurrent to the solution in which the gas is to be absorbed. The liquid emerges rich in acid gas, i.e., about 60-90% of its absorptive capacity having been used. The gas emerges substantially free of its acidic component. The liquid then flows to a flash drum and from there to the regenerator which is at lower pressure. This tower consists of a contacting zone and a reboiler. Generally steam, generated in the reboiler, passes upward through the liquid to be regenerated, stripping the acid gas away. The liquid emerges from the regenerator "lean," in regard to acid gas content, with about 15-35% of its capacity for acid gas being saturated. The lean solution is then pumped to the top of the absorber to contact the gas mixture entering at the absorber base.

The scrubbing solution in the absorption tower would comprise 25-35 wt. percent $K_2CO_3$, 5-10 wt. percent, 1,6-hexamethyldiamine, 5-10% boric acid and the remainder water. The solution is passed into the top of the tower and countercurrently contacts a feedstream comprising $CO_2$ and $H_2$ in the absorption tower, at a temperature of 35 to 150° C., and a pressure of 200 to 1,000 p.s.i.g.; the gas contact time is about 1 to 5 minutes. Solution rich in $CO_2$, e.g., 70 to 90% of capacity must then be regenerated for recycle back to the top of the absorber.

The $CO_2$ rich solution is removed from the bottom of the absorber; pressure is reduced and the solution passes into a flash drum. In the flash drum pressure is maintained at 2-10 p.s.i.g., and temperature is 110-160° C. About 35-40% of the net $CO_2$ is removed at this point. The solution is then passed into the top of the stripping tower; temperature and pressure within the tower is the same as in the flash drum. Steam is passed through the tower at a rate of 0.5 to 1.5 lbs. of steam per lb. of $CO_2$. The solution containing about 15-35% $CO_2$ compared to its theoretical capacity for $CO_2$ is recovered and passed back into the absorbing tower.

Example 1

The desorption (and absorption) of $CO_2$ illustrated in this Example took place in a single liquid phase in a one liter, glass vessel containing 600 cc. of scrubbing solution. Three different promoted potassium carbonate/bicarbonate buffer solutions containing 24 wt. percent alkali salt solution having 1:1 molar ratio carbonate to bicarbonate were saturated with $CO_2$ by bubbling pure $CO_2$ through the liquid at 780 mm. Hg total pressure. The gas was introduced through a sparger beneath the liquid surface; the liquid was agitated with a stirrer. A heating jacket maintained the liquid temperature at 80±0.1° C. The rate of absorption was determined by measuring the difference between the flow of $CO_2$ into and out of the vessel. The flow leaving the vessel was measured by a capillary constriction flow meter.

The solutions became saturated and were desorbed, in the same vessel, by sparging the solution with nitrogen at a flow rate of nitrogen of 2 mols per hour. The flow rate was sufficiently high to avoid significant gas phase resistance during desorption. $CO_2$ in the effluent nitrogen was measured chromatographically. Desorption rate measurements were made at 100° C., using $N_2$ heated to 150° C., until substantially all of the $CO_2$ had been removed from the solution.

The desorption and absorption rate results are compared in Table I. Solution I contained the synergistic promoter system comprising 5 wt. percent 1,6-hexanediamine and 10 wt. percent boric acid. Solution II was promoted with 10 wt. percent 1,6-hexanediamine (no hydration catalyst). And solution III contained 10 wt. percent of a mixture of prior art amine, diethanolamine, in 1:1 molar ratio with boric acid.

TABLE I

| Solution | $CO_2$ sorption rate relative to that for Solution III | |
|---|---|---|
| | Absorption | Desorption |
| I | 2.1 | 4.0 |
| II | 5.0 | 2.5 |
| III | 1.0 | 1.0 |

These comparative data show that the promoter system comprising boric acid in conjunction with 1,6-hexanediamine is greatly superior in desorption to 1,6-hexanediamine alone and to the prior art system. For the mixed promoter (solution I) the absorption rate is higher than in solution III but less than for solution II. However, the economic debit for lower absorption rate is minor compared to the credits of lower stripping steam and fewer desorber stages, associated with the higher desorption rate. Moreover, the rate advantage shown above for the synergistic promoter system is not diminished if the comparison is based on even higher concentrations of the prior art promoter, i.e., 15 wt. percent mixture of diethanolamine-boric acid in 1:1 or 1:2 molar ratio.

Example 2

To illustrate the improved steam economy with the high desorption rate, mixed synergistic promoter three solutions were compared in a pilot plant comprising absorber, flash and stripper regenerator with continuous solution recirculation from the stripper base to the top of the reboiler. The absorber was built from 2 inch, schedule 160 carbon steel pipe, and packed to a height of 5 feet with ¼ inch Raschig rings. The stripper was made from 3 inch, schedule 80 steel, and packed to a height of 8 feet with ½ inch Intalox saddles. The flash drum was 8 inches diameter by 4 feet high. Absorption took place in a single liquid phase at 250 p.s.i.g. and 220° F. The feed gas was a $N_2$ stream containing 20% $CO_2$. Flashing and stripping desorption were carried out in a single liquid phase at 210–250° F. and 20–25 p.s.i.g. with stripping steam generated by boiling solution in the base of the stripper. In all cases the solution, as prepared, contained 25 wt. percent $K_2CO_3$ and the solution circulation rate was 19.2 gallons/hour. The amount and composition of promoter used with each solution is given in Table II.

The solution working capacity for $CO_2$, defined as the moles of $CO_2$ absorbed (and desorbed) per mol of $K_2CO_3$ in the as prepared solution, was measured by two independent methods. These methods checked closely. The first involved measuring the amount of $CO_2$ scrubbed from the feed gas. This was done by measuring the total gas flow in and out on rotameters, and measuring the percent $CO_2$ in and out on a gas chromatograph. The difference, $CO_2$ in minus $CO_2$ out, represented the $CO_2$ picked up by the scrubbing solution. As a check on this procedure, samples of the $CO_2$ rich and lean solutions were withdrawn and analysed for $CO_2$ content by a method that involved acidifying a known weight of solution and weighing the $CO_2$ evolved after absorption in sodium hydroxide on asbestos. Steam consumption was measured by collecting and weighing steam contensed in the stripper reboiler coil, due allowance being made for heat losses from the equipment.

This example shows that under identical reboiler conditions the amount of $CO_2$ absorbed (identical to the amount desorbed since desorption is the limiting operation) is much greater for the mixed hexane diamine/boric acid promoter system. It is noted that absorption is not the limiting operation.

The improvement in working capacity at constant steam rate represents a steam saving for the 1,6-hexane-diamine/boric acid promoted solution when compared at constant working capacity.

TABLE II

| Promoter system | $CO_2$ working capacity | |
|---|---|---|
| | 1 lb. steam/ lb. $CO_2$ | 1.5 lb. steam/ lb. $CO_2$ |
| 8 wt. percent 1,6-hexanediamine plus 7 wt. percent boric acid | 0.50 | 0.62 |
| 10 wt. percent 1,6-hexanediamine | 0.28 | 0.50 |
| 10 wt. percent diethanolamine-boric acid in 1:1 molar ratio | 0.18 | 0.21 |

Example 3

Further evidence for the superiority of the mixed 1,6-hexanediamine/boric acid promoter system as compared with 1,6-hexanediamine alone or boric acid mixed with prior art amines can be seen from the corrosion rate data in Table III. These corrosion tests were conducted using standard coupons (approximately 1" x 3" in size) of carbon steel and 410 stainless steel in a stirred autoclave at 270° F. and 75 p.s.i.g. $CO_2$ pressure. The test lasted for 21 days.

TABLE III

| Promoter system | Average corrosion rate, mils/year | |
|---|---|---|
| | Carbon steel | 410 stainless steel |
| 10 wt. percent, 1,6-hexanediamine plus 5 wt. percent boric acid | 1.5 | 2 |
| 10 wt. percent 1,6-hexanediamine | 5 | 3 |
| 10 wt. percent diethanolamine-boric acid in 1:1 molar ratio, plus 2 wt. percent potassium metavanadate corrosion inhibitor | 6 | 6 |

The mixed 1,6-hexanediamine/boric acid promoter with no corrosion inhibitor gives a lower corrosion rate than the other solutions, particularly with carbon steel.

Example 4

In this Example the components and conditions of Example 1 are utilized except that piperidine is used in place of 1,6-hexanediamine. The results observed are substantially identical.

Example 5

In this Example the components and conditions of Example 1 are utilized except that in place of boric acid formaldehyde is utilized. The results observed are substantially identical.

Example 6

In this Example the components and conditions of Example 2 are utilized except that in place of boric acid, sulfurous acid is utilized. The results observed are substantially identical.

What is claimed is:

1. A process for removing acid gases from a gaseous mixture, said acid gases being selected from the group consisting of $CO_2$, $H_2S$, HCN, $CS_2$, COS, $SO_2$ and oxidation products and sulfides of methane, ethane, propane and butane which comprises contacting said mixture with a solution, said solution comprising 5 to 40 wt. percent of an alkali metal salt, said salt selected from the group consisting of potassium carbonate and sodium carbonate and a synergistic promoter system comprising at least about 2 wt. percent of an amine, said amine being selected from the group consisting of piperidine, derivaties of piperidine, 1,6-hexanediamine and derivatives of 1,6-hexanediamine and boric acid, and said boric acid being present in the amount of from 0.5 to 5 moles of boric acid per mole of amine, at a temperature of 25 to 200° C., and a pressure of 5 to 2,000 p.s.i.g. and maintaining said solution in a single phase during said contacting wherein at least a portion of said acid gas is absorbed by said solution.

2. The process of claim 1 wherein the derivatives of piperidine have the following formula:

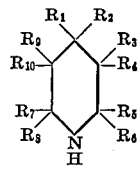

where $R_1$–$R_{10}$ may be selected independently from the group consisting of hydrogen, $C_{1-3}$ alkyl groups and $C_2$–$C_3$ alkenyl groups, and the derivatives of 1,6-hexanediamine have the following formula:

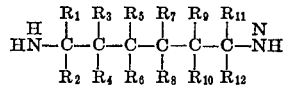

where $R_1$–$R_{10}$ may be selected independently from the group consisting of hydrogen, $C_1$–$C_3$ alkyl groups and $C_2$–$C_3$ alkenyl groups.

3. The process of claim 2 wherein said solution is regenerated after becoming substantially saturated with said acid gas.

4. The process of claim 3 wherein the acid gas is $CO_2$.

5. The process of claim 4 wherein said amine is 1,6-hexanediamine.

6. The process of claim 4 wherein said amine is piperidine.

7. The process of claim 3 wherein said amine is 1,6-hexanediamine in the amount of about 2 to 20 wt. percent.

8. The process of claim 7 wherein said salt is $K_2CO_3$ in the amount of about 25 to 35 wt. percent wherein substantially none of the salt precipitates from said solution.

9. A composition for scrubbing acid gases which comprises 5 to 40 wt. percent of an alkali metal salt selected from the group consisting of potassium carbonate and sodium carbonate, at least 2 wt. percent of an amine selected from the group consisting of 1,6-hexanediamine, derivatives of 1,6-hexanediamine, piperidine and derivatives of piperidine, and 0.5 to 5 moles of boric acid, the balance of the composition being water.

10. The composition of claim 9 wherein said amine is 1,6-hexanediamine.

11. The composition of claim 9 wherein salt is $K_2CO_3$.

References Cited
UNITED STATES PATENTS

| | | | |
|---|---|---|---|
| 1,920,626 | 8/1933 | Bragg | 423—223 |
| 3,637,345 | 1/1972 | Leder | 423—228 |

EARL C. THOMAS, Primary Examiner

U.S. Cl. X.R.

423—228, 232, 236, 243; 252—192